United States Patent [19]

Hodge et al.

[11] 4,225,214
[45] Sep. 30, 1980

[54] CONNECTOR CONSTRUCTION

[75] Inventors: Malcolm H. Hodge, Claymont, Del.; Robert E. Lumpp, Addison; Mark Margolin, Chicago, both of Ill.

[73] Assignee: TRW Inc., Elk Grove Village, Ill.

[21] Appl. No.: 943,470

[22] Filed: Sep. 18, 1978

[51] Int. Cl.³ ............................................. G02B 5/14
[52] U.S. Cl. ............................................. 350/96.21
[58] Field of Search ................................. 350/96.21

[56] References Cited

U.S. PATENT DOCUMENTS

| 3,966,299 | 6/1976 | Osterfield et al. | 350/96.21 |
| 4,045,121 | 8/1977 | Clark | 350/96.21 |
| 4,105,285 | 8/1978 | Bedgood et al. | 350/96.21 |

FOREIGN PATENT DOCUMENTS

| 2291510 | 6/1976 | France | 350/96.21 |

Primary Examiner—Stewart J. Levy
Attorney, Agent, or Firm—Neuman, Williams, Anderson & Olson

[57] ABSTRACT

A connector construction for joining optical fiber ends in an optical signal transmissive system comprises interlocking, telescoping plug and receptacle connector members. Each member engages a cable end from which at least one optical fiber extends. The fiber terminal portion in the receptacle is received in an adjacently mounted optical fiber guide having a passageway in which the fiber joint is to be effected. The optical fiber end or ends in the connector plug is received in a retractable, protective cylinder having an apertured distal end adapted to mate with the distal end of the optical fiber guide of the connector receptacle. The connector receptacle is telescopically received in the housing of the connector plug as the fiber(guide distal end mates with the retractable cylinder and forces such cylinder to retract in the direction of the plug clamp. Simultaneously, the optical fiber extending from the plug clamp is passed through the distal end of the optical fiber passageway and engages the fiber end extending from the connector receptacle in an efficient joint.

Two connector embodiments are provided. In a first connector embodiment, receptacle spring arms having locking lugs are guidably received in mating recesses of a connector plug with an audible "snap," thereby audibly advising when the desired interlock is complete. In a second connector embodiment the connector plug and receptacle threadably intermate a precise distance for precise optical fiber relationship as will hereinafter be disclosed in greater detail.

15 Claims, 19 Drawing Figures

CONNECTOR CONSTRUCTION

This invention relates to a connector construction for joining the ends of optical fibers in an efficient releasable connection with a resulting minimum loss of transmitted light.

The increasing use of optical fiber communications in recent years is well-known. The absence of undesired interference and crosstalk found in conventional electrically conducting wire systems plus other advantages have provided impetus for increasing the use of fiber optic systems in a large number of civilian, military and industrial applications.

In optical fiber systems the difficulties in efficiently joining the ends of an optical fiber with miniminal resulting light loss are apparent. Such fibers have a small active core area particularly when employed in long distance applications. Various techniques for locating or centering optical fibers prior to effecting a joint by butting fiber ends are discussed in the article "Demountable Connectors For Optical Fiber Systems" by M. A. Bedgood, J. Leach, and M. Matthews, published in 1976 in Volume 51, Number 2, of ELECTRICAL COMMUNICATION.

The degrees of signal or light loss resulting from varying fiber end separations, misalignments Fresnel reflections, and various fiber imperfections are well-known and discussed in an article by Robert Hawk and Frank L. Thiel entitled Low Loss Splicing On Connection Of Spherical Waveguide Cables published in Volume 63 of SPIE (1975) Guided Optical Communications pages 109-113. The desiderata in fiber optic connectors which will reduce light loss to a minimum are discussed in a paper presented by Kenneth J. Fenton and Donald L. McCartney entitled Connecting The Thread Of Light published at the Ninth Annual Connectors Symposium on Oct. 20, 1976 at the Cherry Hill Hyatt House in Cherry Hill, N.J.

Prior art endeavors to provide optical fiber connectors resulting in low light loss at the connection comprise patents such as Martin U.S. Pat. No. 3,948,582 in which a fiber connection is effected in an axial bore by a filament-carrying plug with the aim of having the fibers abut or become closely spaced.

In U.S. Pat. No. 4,008,948 of Dalgleish et al, fiber-housing subassemblies slidably interfit in a central connector element, the fibers being axially moved in partially unsupported positions during the connection operation.

Arnold U.S. Pat. No. 4,047,797 is directed to a fiber optic connector particularly adapted to prevent overstressing of the connected fibers by engaging strength members of such cables containing the optical fibers.

Dalgleish et al U.S. Pat. No. 3,885,859 is directed to optical fiber connectors in which the optic fibers are placed in connector V-grooves and retained in place by clamp arm locking members.

In Tardy U.S. Pat. No. 4,050,783 a connector for optical fibers is disclosed employing clampled cylindrical guide rods for the fibers.

Hodge co-pending application Ser. No. 758,106 filed Jan. 10, 1977 now abandoned is directed to a guide connector assembly for connecting the ends of optical fibers in a guide composed of smooth glass rods disposed in telescoping hermaphroditic connector members.

In the foregoing structures continual protection and guided support of the optical fibers to be connected are not realized. As a result, damage may be imparted to an unsupported optical fiber end in the course of being located in a connector for butting engagement with another optical fiber end. Such damage could result in significant light loss at the fiber connection. In addition, many of the prior art constructions required the permanent securing of one or both optical fiber ends in place prior to connection, resulting in a connection which is not readily repairable to alterable at the connection site.

It is an object of this invention, therefore, to provide an optical fiber connector construction in which the optical fiber ends are continuously, protectively supported in the course of connection, assuring the absence of mechanical damage to the fiber ends with attendant light loss.

It is another object of this invention to provide precise optical fiber end connections enabling preparation of two cable ends to be conducted at spaced locations for subsequent joinder of such ends at the connection site.

It is another object of this invention to provide an optical fiber connector in which the protected fiber ends are able to effect a slight bending action which assures precise location in a fiber guide.

It is another object of this invention to provide an optical fiber connector which is readily adaptable for use with multi-fiber cable because of its simplicity of construction.

It is another object of this invention to provide a simplified connector construction enabling all cable preparation and fiber connecting steps to be efficiently carried out in the field by a workman in the absence of precisely controlled conditions normally found in the laboratory.

It is a still further object of this condition to provide an optical fiber connector construction enabling the cable ends to be prepared in a minimum amount of time, utilizing minimum lengths of cable ends.

It is another object of this invention to provide a connector for optical fibers which effects substantially instantaneous connection and disengagement after the cable ends from which the fibers extend have been clamped in connector plug and receptacle members.

It is yet another object of this invention to provide a connector construction which is adaptable for use with a wide range of cable members, and is extremely simple to employ being composed of a relatively small number of inexpensive parts.

The above and other objects of this invention will become more apparent from the following detailed description when read in the light of the accompanying drawings and appended claims.

In one embodiment of the provided connector construction a connector receptacle is provided comprising a housing having a clamp disposed at one end. An optical fiber cable and adjacent fiber portion extending therefrom are clamped in unmovable relation. The fiber extends part way into a passageway of an adjacent optical fiber guide mounted in the receptacle housing, and in which the desired fiber end connection is to be effected. A second optical fiber cable and extending fiber are clamped in place in a connector plug of the provided connector system. The fiber extending from the second cable is centrally received in the end of a protectively encompassing, resiliently-loaded piston spaced from the second clamp by a spring or the like and having an end configured to mate with the end of the receptacle optical fiber guide.

In the normal course of effecting a connection, the plug piston end is mated with the fiber guide end, and the connector plug is urged in the direction of the guide and receptacle. The plug optical fiber is progressively fed into the glass rod guide as the resilient means between the plug clamp and piston compresses until the desired fiber junction is effected. In one connector embodiment the plug and receptacle are locked together in threaded engagement. In a second embodiment the plug and receptacle are joined by a snap-lock construction hereinafter described in greater detail.

For a more complete understanding of this invention reference will now be made to the drawings wherein:

FIG. 4 illustrates the nature of the interlock effected between the telescoping plug and receptacle;

Figure 1:
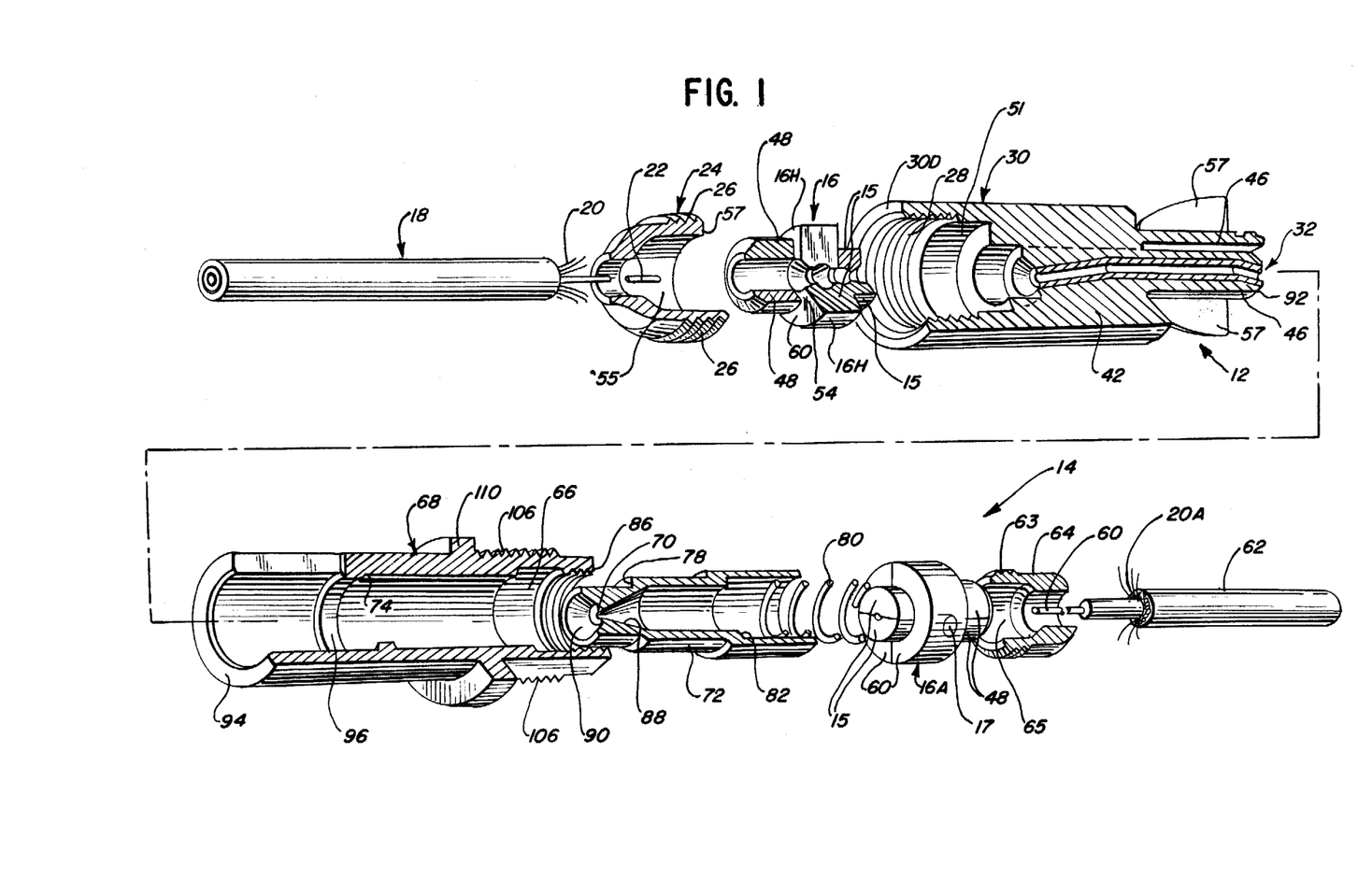
FIG. 1 is an exploded view of an optical fiber connector, the elements of the connector receptacle and plug being partly in section and shown in adjacent relationship; the connector elements of FIG. 1 are adapted to mate by a "snap lock" interengagement of mating parts.

Referring now more particularly to FIG. 1 an exploded view is illustrated of a connector 10 comprising elements of a connector receptacle 12 adapted to engage in telescoping interlocking relationship the elements of a connector plug 14. Connector receptacle 12 has a housing body or shell 30 adapted to receive clamp 16 formed of hermaphroditic half portions 16H. The latter clamp is adapted to engage elements of optical fiber cable 18. Cable 18 is composed of a number of concentric sheaths retained in spaced relationship by longitudinally disposed strength members 20 which add tensile strength to the cable and which may comprise plastic filaments of high tensile strength. The innermost concentric element of the optical fiber cable 18 comprises an optical fiber 22 which is adapted to convey signals in the normal course of use.

Figure 3:
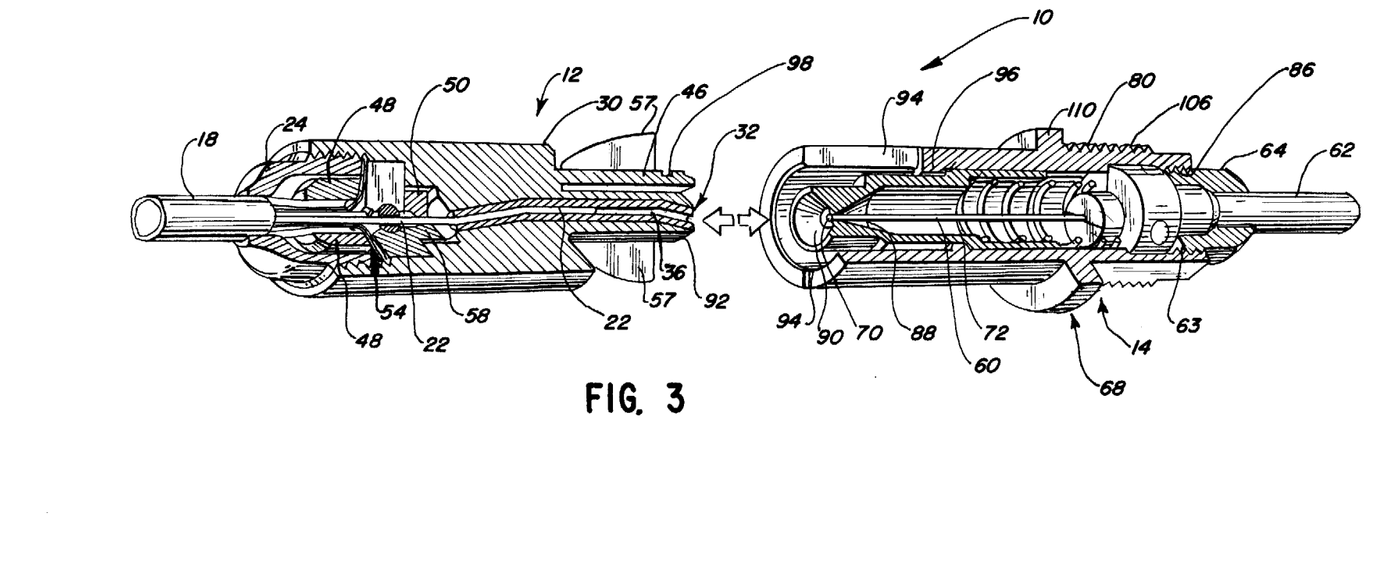
FIG. 3 is a perspective view partly in section of the plug and receptacle elements of FIG. 1 in assembled relationship prior to interlocking into the position of FIG. 2.
Figure 4:
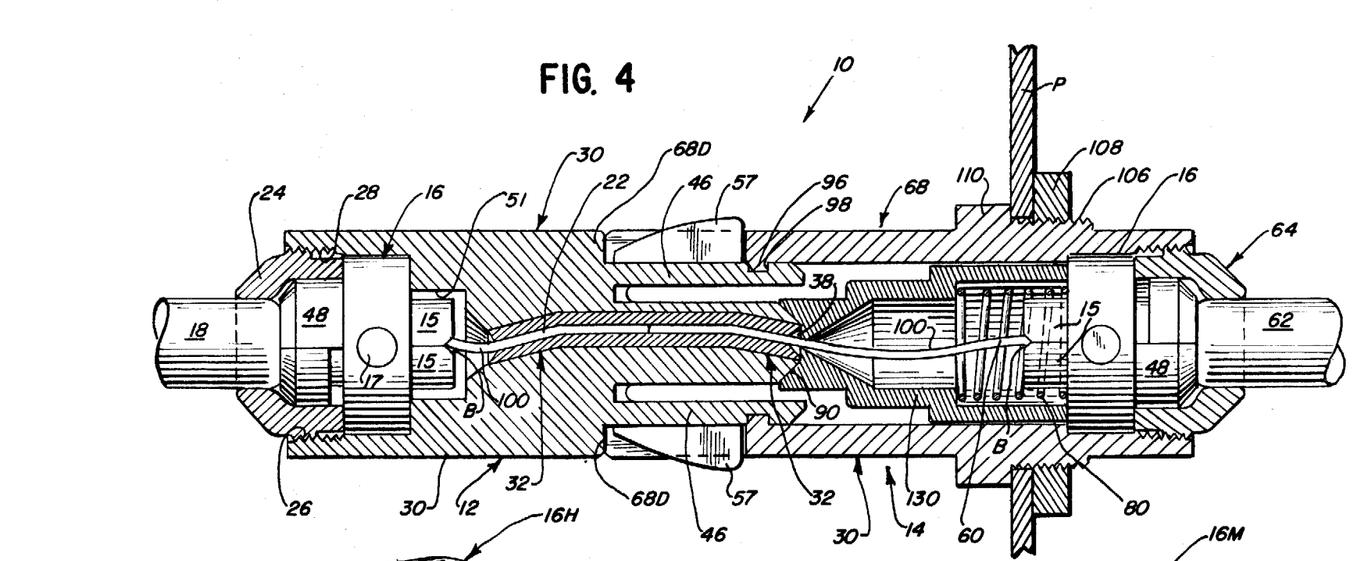
FIG. 4 is a longitudinal sectional view of the plug and receptacle of FIGS. 1, 2, 3 in interlocking relationship and mounted on a mounting panel.
Figure 5:
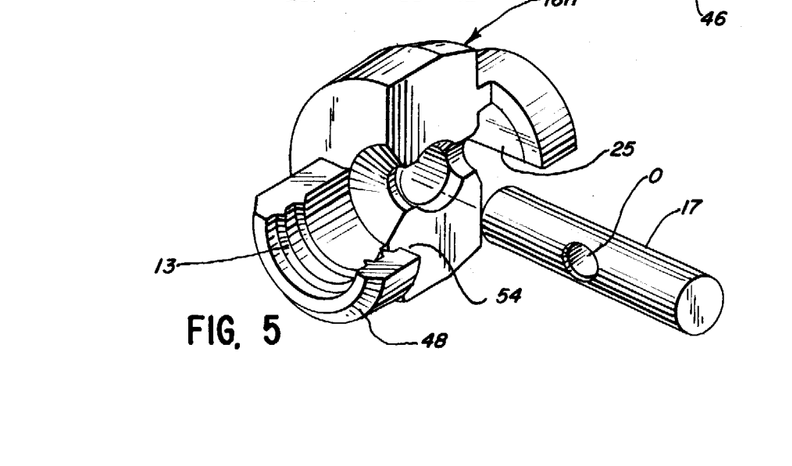
FIG. 5 is a perspective view of a hermaphroditic clamp member which may be employed in forming the clamps employed in the connectors of this invention.

Hermaphroditic clamp portion 16H illustrated in perspective in FIG. 5 pivotally mates with itself by means of an apertured pivot pin 17 of FIG. 5. In the modified hermaphroditic clamp half portion 16M of FIG. 6 the pivot means comprises a lug 19 and slot 21 formed with each half 16M. Both of these clamp constructions are disclosed in Lumpp and Margolin application Ser. No. 943,336, filed Sept. 18, 1978. As seen in FIG. 3 opposed clamp jaws 48 are adapted to clampingly engage outermost sheath of the optical fiber cable and thus the entire cable diameter 18. The jaws 48 may have projecting ribs 13 formed thereon as seen in FIG. 5 for a better gripping engagement with the cable 18. End portions 15 of the clamp 16 comprise smaller jaws adapted to clampingly engage the central optical fiber 22 in the manner most clearly seen in FIG. 4 of the drawing. Jaws 15 may have resilient inserts or coatings such as resilient insert 25 of FIG. 5. The fiber clamping jaws 15 should have beveled clamping edges as at B in FIG. 4 to obviate abrupt bending of the fibers 60 and 22 which might damage the fibers or their cladding. The opposed jaws 48 and 15 effect simultaneous clamping and release action by virtue of the scissorlike relationship between the hermaphroditic half portions 16H of the clamp 16 as is disclosed in detail in the co-pending Lumpp and Margolin application. Inner cavity 55 of clamp nut 24 is adapted to snugly receive the outer cylindrical surfaces of clamp jaws 48 therein and exert a locking function retaining the jaws 48 in clamping engagement with an interposed cable 18. As an alternative construction separate locking means such as an O-ring or encompassing band may encompass the jaws 48 and the entire assembly be disposed within clamp cavity 55.

Provided clamp 16 effects a third clamping action by lockingly engaging strength members 20 of cable 22 passing through preformed slots or relieved portions 54, see FIG. 3 formed in each edge of clamping jaw 48. The optical cable strength members 22 are then lockingly clamped between annular edge 57 of clamp nut 58 and adjacent planar surfaces 60 (FIG. 1) of the hermaphroditic clamp half portions 16H in a manner more clearly seen in FIG. 3.

Each cable clamp 16 is thus adapted to clampingly engage a peripheral portion of the optical fiber cable 18 prior to assembly with the remaining elements of the connector receptacle 12. Clamp 16 after assembly with cable 18 is receivable in a recess 51 formed in the receptacle body 30, see FIG. 1. Cable clamp nut 24 may then threadedly engage threads 28 of the receptacle housing, securely locking clamp 16 in place in the manner best seen in FIG. 4. In such position of assembly the clamp jaws 15 are disposed adjacent entranceway 33 of optical fiber guide 32 having entranceway 38 aligned along the central longitudinal axis of the connector. Guide 32 may be embedded in housing 30 as illustrated.

Optical fiber guide 32 employed in the connector receptacle 12 of FIG. 1 is not per se an inventive feature of the provided connector construction. The use of such optical fiber guides is disclosed in co-pending Hodge applications Ser. No. 758,106 now abandoned as well as Ser. No. 838,350, filed Sept. 30, 1977 now abandoned.

Figure 15:
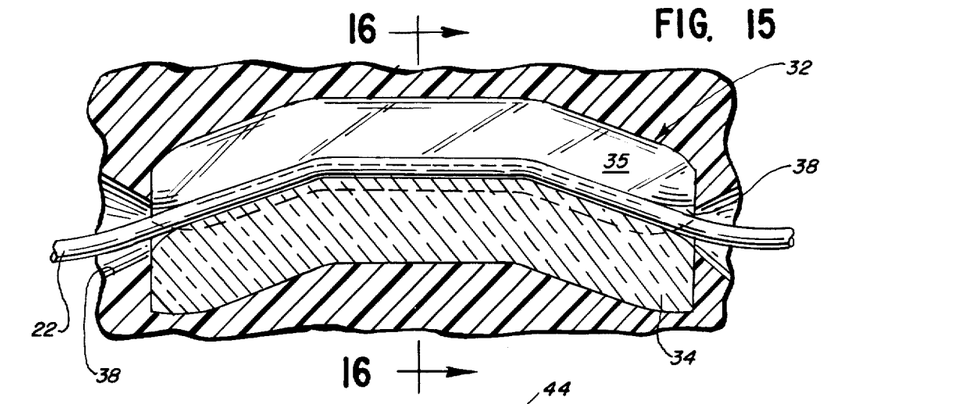
FIG. 15 is a fragmentary longitudinal sectional view of a fiber guide employed in the receptacle portion of the provided connectors.

The optical fiber guide 32 as is clearly seen in FIG. 15 comprises an assembly of three or more glass rods such as rods 34, 35 and 37 arranged in side-by-side relationship and parallel to each other. Longitudinal peripheral portions of adjacent rods are in contact and fused together so as to form a cusp-shaped interstitial channel or fiber passageway 36 illustrated in sectional view in FIG. 16. It will be noted from FIG. 15 that the end portions of the rods defining opposed entranceways 38 are of smaller diameter than the remaining rod portions. The entranceways 38 are thus of greater cross-sectional area than the inner interstitial passageway 36. Such enlarged openings at opposed ends of the optical fiber guide 32 facilitate threading or entering of an optical fiber end into the passageway, such as fiber end 22 of the cable 18.

Figure 14:
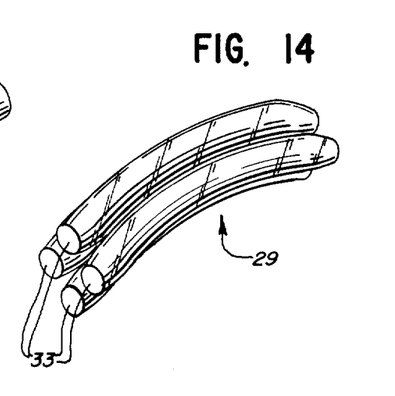
FIG. 14 is a perspective view of an optical fiber guide which may be employed in the connector constructions of this application employing four guide rods.

Whereas FIG. 15 illustrates an optical fiber guide 32 composed of three glass rods 34, 35 and 37, it will be noted from FIG. 14 that an assembly 29 of four glass rods 33 will work to equal advantage forming a passageway with four cusps. Also, the rods 33 thereof are formed about a uniform arc.

Figure 16:
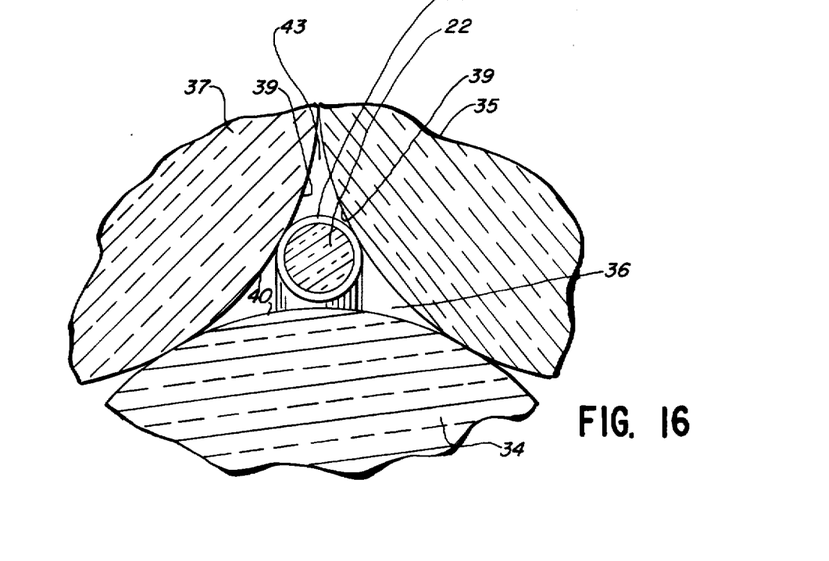
FIG. 16 is a fragmentary transverse sectional view illustrated on an enlarged scale taken on line 16—16 of FIG. 15.

It is evident from FIG. 16 that each of the glass rods 34, 35 and 37 will effect a tangential, line contact with a peripheral portion of illustrated glass optical fiber 22 when engaging the same during fiber insertion into the guide.

It will be seen from FIG. 15 that the passageway 36 is of slightly larger sectional area than that of fiber 22 received therein. The periphery of fiber 22 will thus encounter minimal resistance as it effects tangential line contacts with inner curved surfaces 39 of the glass rods.

Figure 13:
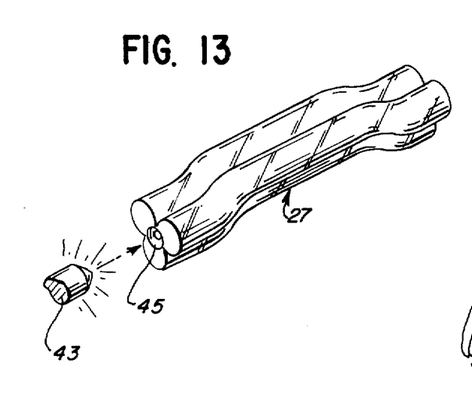
FIG. 13 is a perspective view of an optical fiber guide which may be employed in the provided connector constructions.

During formation of the guides of FIGS. 13, 14 and 15, the surfaces of the glass rods are subjected to a temperature adequate to fuse the contacting peripheral portions together whereby the rods become fire polished and assume extremely smooth surfaces. Such inherent ability of glass to be fire polished renders the use of glass as the material of composition for the rods preferable to the use of other materials such as hard ceramics. Such smooth-surface condition is greatly desired as it tends to obviate any undesired scraping action on the end of the optical fiber 22 fed into the guide 32 or on softer cladding material 44 of such fiber. Such cladding material envelopes each optical fiber 22 and has an index of refraction different from that of the fiber 22 for light retention purposes.

It will be noted from FIGS. 13 through 15 that the opposed end portions of the glass rods 34 are angularly disposed in parallel relationship to main central portions of the rods also disposed in parallel relationship. Such end configuration is obtained, for example, by bending end portions of the rods along desired radii when in the heat-softened condition.

Such rod end configurations force the optical fibers entering the opposed passageway ends to assume a nonaxial, bent configuration. Such curvilinear bent portions comprise a biasing force urging the fiber end into a specific "track" comprising a passageway cusp such as cusp 43 of FIG. 16 defined by rods 35, 37. Such forced location in a single passageway cusp assures that the terminal ends of the fibers disposed within the passageway 36 of the fiber guide abut in a desired end-to-end relationship and do not assume a misaligned relationship resulting in significant light signal losses.

FIGS. 13 through 15 also illustrate the enlarged optical fiber entranceways of the rod assemblies 27, 29 and 32. Such entranceways may be formed in a number of ways as by employing a heated dowel 43 of FIG. 13 so as to form a conical opening 45 at the ends of guide 27. The rod ends may be dipped in a glass-attacking acid such as hydrofluoric to uniformly etch the ends of the rods; rods 33 of the guide 29 of FIG. 14 have been so processed.

After formation, the glass rods defining the optical fiber guide 32 may be molded with the housing 30 of the connector receptacle in the manner illustrated in FIG. 1. The housing and casting material may be formed of a moldable plastic such as Nylon, ABS, Styrene, Noryl, or a castable plastic such as an epoxy resin. In the course of such molding care must be taken to plug the opposed guide entranceways 38 with a readily removable material so as to insure that no guide passageway portion is plugged in the course of embedding the guide 32 in the remainder of the housing 30.

The guide 32 is predeterminately located prior to molding of the connector receptacle 30 so that the opposed entranceways 38 have the centers thereof in axial alignment with the central longitudinal axis of the receptacle 12. The fiber guide 32 may either be molded integrally with the body 30 as above indicated, or be first embedded in a matrix which is fused or adhesively secured to the periphery of a housing cavity in the course of receptacle fabrication. Thus in FIG. 1 the dotted lines are representative of the guide 32 when previously embedded in a plastic matrix or potting compound forming a separate body 42 which is subsequently secured to a preformed cavity of the connector. It will be noted from FIG. 1 that whereas female threads 28 are disposed at one end of the receptacle housing 12, the opposed housing end comprises spaced, resilient, cantilever arms 46 integrally formed with the remainder of the receptacle housing. Arms 46 have integrally formed therewith and laterally extending therefrom, vanes 57. Each cantilever arm 46 may flexibly move inwardly relative to the underlying, adjacent portion of the receptacle in which an end portion of the optical fiber guide 32 is disposed.

In the normal course of assembly of the elements of the connector receptacle 12 into the assembled condition illustrated in FIG. 3, clamp nut 24 is assembled to the optical fiber cable 18. The cable is then trimmed to conform with the requirements of the clamp 16.

The optical fiber 22 is cut by means of a scribing tool so as to define a length which will terminate after incorporation in the receptacle 12 at the approximate midpoint and the adjacent optical fiber guide 32 in the manner illustrated most clearly in FIGS. 3 and 4 of the drawing. The cable and concentric elements thereof are then clamped in place in the manner above described, with the clamping jaws 48 and 15 of the clamp 16. In the assembled condition of FIG. 3, the receptacle housing 30 is threadedly engaged with cable clamp nut 24 by means of clamp nut male threads 26 which engage female threads 28 of the housing. Such engagement effectively locks clamp 16 in place as illustrated with the cable 18 and optical fiber 22 clampingly engaged by the spaced jaws of the clamp 16. A third clamping engagement of the cable strength members 20 of the optical fiber cable is also effected in the manner above described. The clamp 16 and cable are thus nested in fixed relation within the clamp receptacle 12. The distal end of optical fiber 22 which had been cut to predetermined length is threaded into guide 32, extending to the approximate midpoint of the guide passageway 36 in the manner clearly seen in FIG. 3. As seen in FIG. 4 an interval should be present between clamping jaws 15 and adjacent flared entranceway 38 to the fiber guide 32 to permit the fiber 22 to bend for imparting a cusp engaging bias to the fiber as above described, the bend 100 being shown in FIG. 4 between the clamp 16 and guide 32.

Referring once again to FIG. 1, it will be seen that cable 62 is received in clamp nut 64 of the connector plug 14. Clamp nut 64 has a recess 65 for reception of cable-engaging jaws 48 of clamp 16A which recess is of precisely the same configuration as such jaws. Clamp 16A is also adapted to be received in recess 66 of connector plug housing 68 in a manner most clearly seen in FIG. 3.

In accordance with this invention optical fiber 60 which is adapted to be engaged in a signal transmissive juncture with the end of fiber 22 disposed in the passageway 36 the optical fiber guide 32 illustrated in detail in FIGS. 15 and 16 is threaded through central opening 70 of encompassing protective piston 72 which is reciprocally slidably movable within connector plug housing 68. Piston 72 moves between annular stop shoulder 74 of housing 68 and planar surfaces 60 of the hermaphroditic half portions of the clamp 16A illustrated in assembled relationship with the remaining elements of the connector plug in FIG. 3. The fiber-centering and protective piston 72 is reciprocally movable in the plug housing with the assistance of coil spring 80 which engages inner annular shoulder 82 of the reciprocally movable piston 72 at one spring end and is centered about the fiber-clamping jaws 15 at the opposed spring end limit.

The optical fiber cable 62, the strength members 20A and the optical fiber 60 of the cable 62 are clamped between the elements of the clamp 16A of plug 14 in precisely the same manner as above described with respect to cable 18 and clamp 16. The end of the optical fiber 60 is cut to a predetermined length so as to be received in opening 70 of the reciprocally movable protective cylinder 72. The elements of the connector plug 14 illustrated in FIG. 1 are locked into the assembled condition illustrated in FIG. 3 by engaging threads 63 of the clamp nut 64 with female threads 86 disposed at one end of the plug housing 68. Formed 180° apart at the opposed end of plug housing 68 are slots 94 adapted to slidably receive receptacle vanes 57 during a plug-receptacle interlock.

The elements of the connector plug 14 are assembled in the following sequence. Clamp nut 64 is assembled to cable 62 and the cable trimmed to meet the requirements of clamp 16A. Concentric elements of the trimmed cable are clamped to clamp 16A. Spring 80 and piston 72 are positioned over fiber 60 and onto clamp 16A. Housing shell 68 is then positioned over the piston-clamp assembly and secured to clamp nut 64. It will be noted from FIG. 3 that opening 70 disposed in the end of the spring loaded, protective cylinder 72 has opposed flared entranceways 88 and 90. Entranceway 88 facilitates the threading of the optical fiber 60 into the opening 70, and the flared entranceway 90 comprises a concave surface adapted to mate with generally convex end 92 defined by the end of the optical fiber guide 32 and its surrounding plastic matrix. Flared entranceway 88 serves a second important function, i.e., providing adequate volume within the piston within which the fiber 60 may bend as a result of the nonaxial entranceways of the fiber guides above described.

In the normal course of effecting an interlock between the connector plug 14 and the connector receptacle 12 of FIG. 1, receptacle vanes 57 are inserted in plug housing slots 94. Tapered end 92 of the receptacle 12 encompassing the optical fiber guide 32 then engages mating conical recess 90 of the plug fiber-protecting piston 72, forcing the piston to retract uniformly because of the resilient piston loading by the spring 80. Simultaneously with such piston retraction, optical fiber 60 is threaded into the tapered entranceway 38, (see FIG. 15) of the fiber passageway 36 of the fiber guide 32. Opposed spring arms 46 integrally formed with the vanes 57 of the connector receptacle 12 slidably telescope within the interior periphery of the plug housing wall. The cantilever arms 46 proceed inwardly into the interior of the connector plug housing until locking rib 96 formed on the inner periphery of the plug housing is received in intermating recesses 98 formed in end portions of the opposed resiliently mounted spring arms 46. The terminal ends of such end portions are beveled to facilitate sliding over rib 96. The interlock evidenced by an audible "snap" in forming the assembler when the desired connection is effected.

Figure 2:
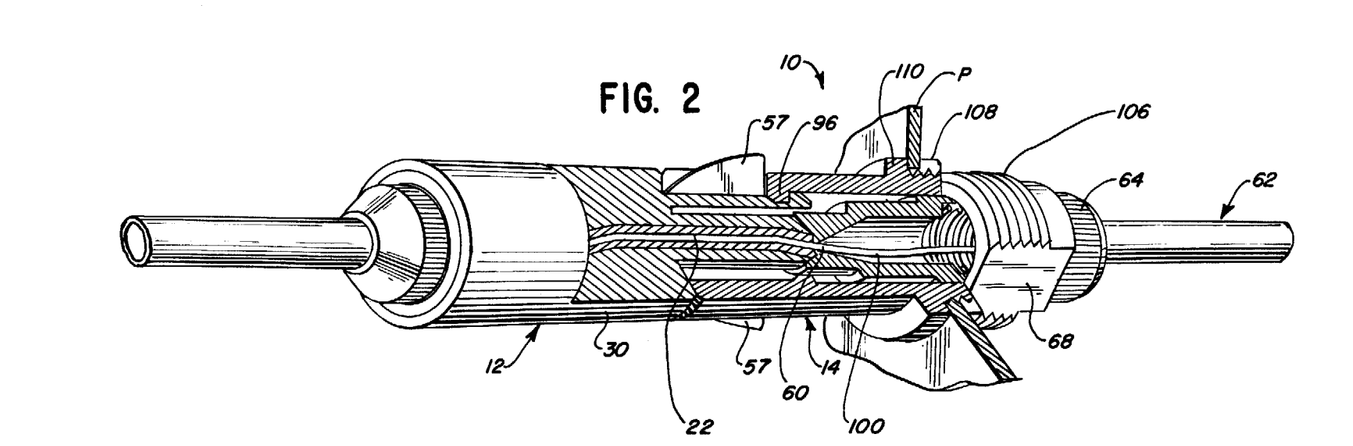
FIG. 2 is a perspective view of the connector elements of FIG. 1 in assembled interlocking relationship mounted on a mounting panel.

The optical fibers 22 and 60 are initially cut to predetermined lengths whereby slight excess lengths are available at the instant of fiber end juncture in the manner illustrated in FIG. 2. Fiber bends such as bend 100 illustrated in FIG. 2 are protectively encompassed and present in both the plug and receptacle housings. Such arcuate bends function as efficient expansion joints for absorbing excess fiber lengths exteriorly of the guide 32. The rods of the provided guides of this invention have excellent size stability over wide temperature ranges. The bends 100 are formed as a result of the angular dispositions of the fiber guide entranceways relative to the connector longitudinal axis. The fiber excess lengths assure that the ends of the fibers 22 and 60 are retained in desired face-to-face engagement without undesired light loss.

As above mentioned, the angular dispositions of the entering fibers assure that the fibers are urged in one passageway cusp defined by opposed curvilinear surfaces such as surfaces 39 illustrated in FIG. 16. As a result, even though the cusp-shaped passageway 36 is of larger cross-sectional area than the cross-sectional area of the optical fibers 22 and 60, the fiber ends will be in desired alignment, resiliently urged against the surfaces 39 so as to avoid misalignment and angular disposition of one fiber relative to the other. The fiber guide angularly disposed end portions also prevent the imparting of such an axial force to the optical fibers within the housing as would result in damage to the fiber ends and thus serve as a force limiting means. The fiber disposition as illustrated in FIG. 16 also insures the provision of adequate space beneath the optical fibers whereby detritus which may have formed and accumulated in the course of feeding the fibers into the passageway 36 will fall into the underlying cusps and in no way accumulate between the ends of the fibers adapted to mate in a signal-transmitting union.

It is believed apparent from the mated plug and receptacle of FIG. 4 that as the optical fiber 60 is threaded into the entranceway 38 of the optical fiber guide 32, significant telescoping action is effected between two tubular portions of housings 68 and 30 of the plug and receptacle respectively. As a result, the telescopic connection illustrated in FIG. 2 is highly resistant to any forces tending to disengage the interlocking members by way of bending action effected transversely to the length of the illustrated connector. Also, disposition of receptacle vanes 57 in plug slots 94 prevents relative rotary movement between the plug and receptacle. It will in addition be most clearly seen from FIG. 4 that the distal end 68D of the plug housing 68 extends over the roots of the spring arms 46 preventing such arms from disengaging by bending or flexing forces imparted to the assembled connector.

It wll also be noted from FIG. 2 that threads 106 disposed about the periphery of the plug housing encircling the clamp 16A enables a clamping ring 108 to threadedly engage the same and serve as a lock in conjunction with raised housing shoulder 110 formed about the periphery of the plug housing 68. Thus the connector assembly 10 of FIG. 2 may be securely mounted in an aperture of mounting panel P in the manner illustrated in FIG. 2.

Unlike many prior art connector constructions, the optical fibers connected by connector 10 are not permanently disposed in the fiber guide 32 or other connector portions. The depicted plug and receptacle 14 and 12 are readily disengaged by merely pressing the opposed vanes 57 toward each other until recesses 98 of the resilient arms 46 are released from locking rib 96 disposed about the inner periphery of plug housing 68. It is seen from the foregoing, therefore, that a simple connector plug and housing construction has been provided which protects the optical fibers being connected at all times and insures a desired connection in which the fiber ends meet in an efficient face-to-face relationship. The provided connection between the telescoping plug and receptacle is extremely strong, resisting both tensile and transverse bending forces, and yet the interlock therebetween may be readily released by manual depression of the resilient locking arms.

As above mentioned, the optical fiber guide 32 is so designed that although the entranceways 38 to the fiber guide are disposed along the central longitudinal axis of the connector plug and receptacle, the inclined entranceways of the passageway 36 force the fibers to effect a bend as the same enter the fiber guide and be urged into a passageway cusp or "track." Any excess optical fiber clamp defining such bend 100 is disposed on the exterior of the fiber guide and should be of such curvature as not to damage the optical fiber. As the optical fiber-termini do not enter the guide passageways in parallel relationship, the fibers are forced to assume the tangential relationship with two of the rods as illustrated in FIG. 16 assuring the desired, aligned, end-to-end abutment. The latter connection minimizes any signal light loss and provides for efficient juncture of fibers of differing cross-section and of a cross-section somewhat smaller than that of the guide passageway.

FIGS. 7 through 12 illustrate a modified connector construction 120 and component parts thereof of substantially the same construction as connector 10 above described in FIGS. 1 through 4. However, in connector 120 the telescoping ends of the plug and receptacle portions are interlocked by means of a threaded connection. The connector construction of FIGS. 1 through 6 lends itself to ready fabrication with a variety of plastics and flexible metals such as aluminum. The connector of FIGS. 7 through 12 is preferably employed in heavy duty applications wherein a high-strength metal may be employed for fabricating the plug and receptacle portions of the connector. Such an application may be one in which the connector is subjected to severe vibration. The particular metal to be employed will, of course, depend upon the particular application in which connector is used. The connector plug and receptacle of FIGS. 7–12 may, of course, also be formed of a variety of plastics.

Figure 7:
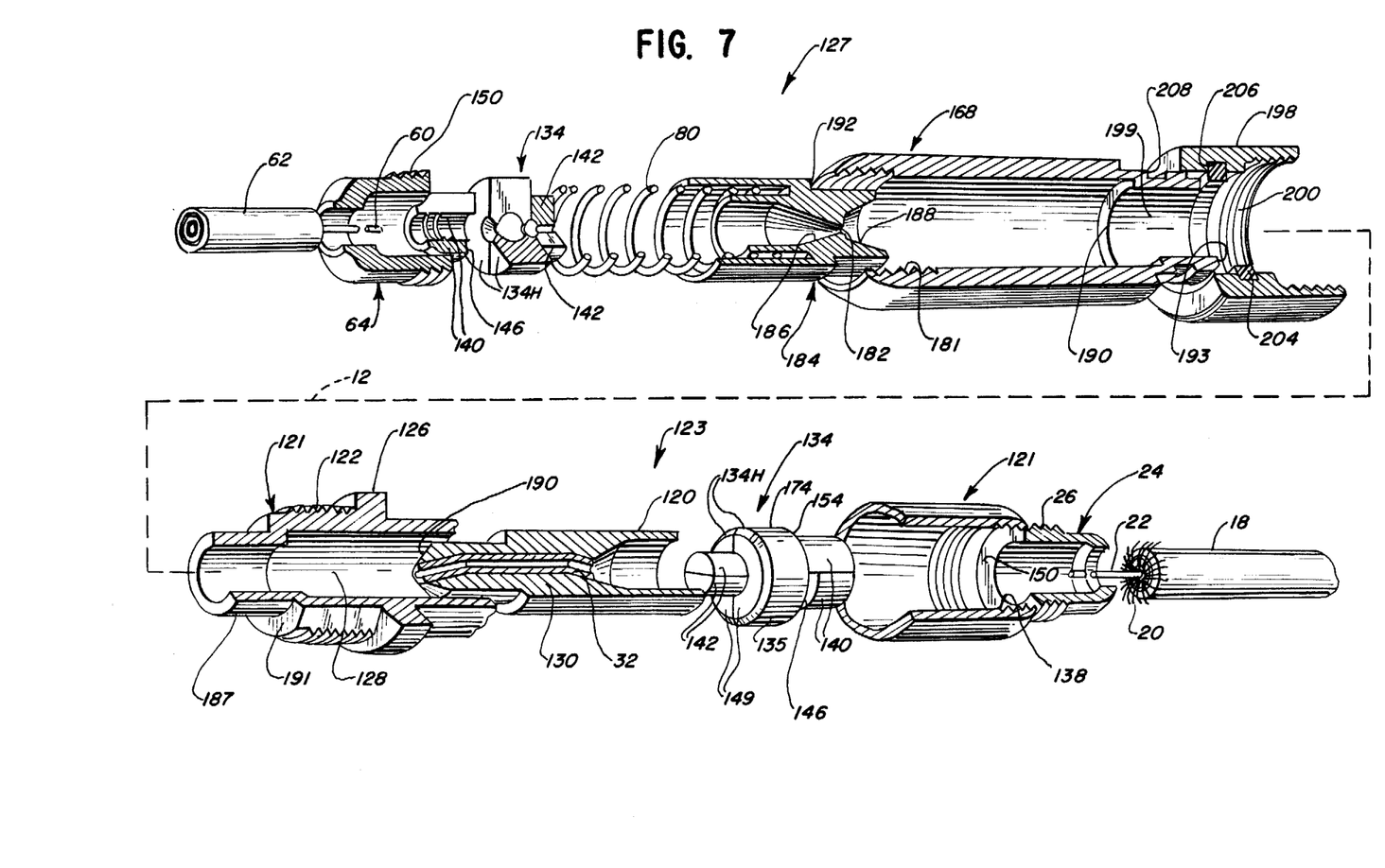
FIG. 7 is an exploded view similar to that of FIG. 1 illustrating another embodiment of a connector made in accordance with this invention which relies upon threaded engagement between interlocking plug and receptacle components.

In FIG. 7 housing 121 (illustrated broken away to facilitate description) of receptacle 123 has female threads 122 disposed about a peripheral portion thereof, annular flange 126 being disposed adjacent the innermost threads on the housing. Interior cylindrical cavity 128 of housing 121 is adapted to nestably receive, preferably in fixed relation therewith as by an adhesive engagement, matrix 130 in which an optical fiber guide such as guide 32 of FIG. 15 is embedded. Whereas the matrix 130 in which the fiber guide 32 is embedded may be formed separately and then adhesively secured in the plug housing cavity 128, it is also possible to employ the housing 121 as a mold wherein the guide 32 may be molded in place in the cavity 128.

Figure 6:
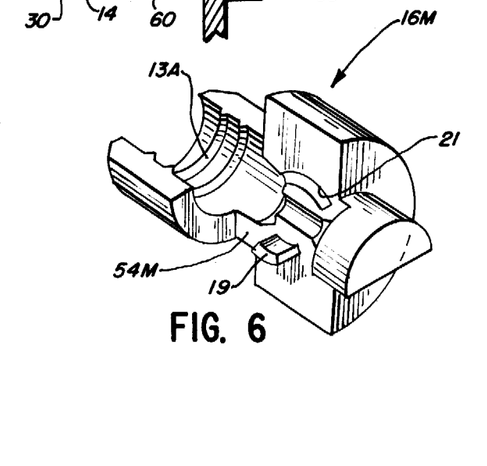
FIG. 6 is a perspective view of a second hermaphroditic clamp which may be employed in forming the clamps employed in the connectors of this invention.

Cable 18 having strength members 20 and optical fiber 22 extending therefrom is to be clamped by clamp 134 which is similar in operation to clamp 16 employed in the above-described connector 10. Hermaphroditic clamp halves 134H have pivot means integrally formed therewith as illustrated in FIG. 6; no third element is needed for functioning as a pivot.

Cable clamp nut 24 illustrated in FIG. 7 is adapted to receive the optical fiber cable 18 therethrough; exterior clamp threads 26 are employed for purposes of engaging threads 138 of receptacle housing 121. The inner periphery of clamp nut 24 functions to retain the clamp jaws 140 together simultaneously with opposed fiber-engaging jaws 142 as a result of the clamp scissorlike action.

Prior to the threaded assembly of clamp nut 24 to housing 121, the optical fiber 22 of cable 18 is threaded into passageway 36 of fiber guide 32 as the end of matrix 130 is butted against planar surfaces 149 of clamp 134. The housing 121 is then fitted over matrix 130 and threadedly engaged to nut 147 if separate from the matrix. The resulting receptacle 123 will appear as in FIG. 9.

Figure 10:
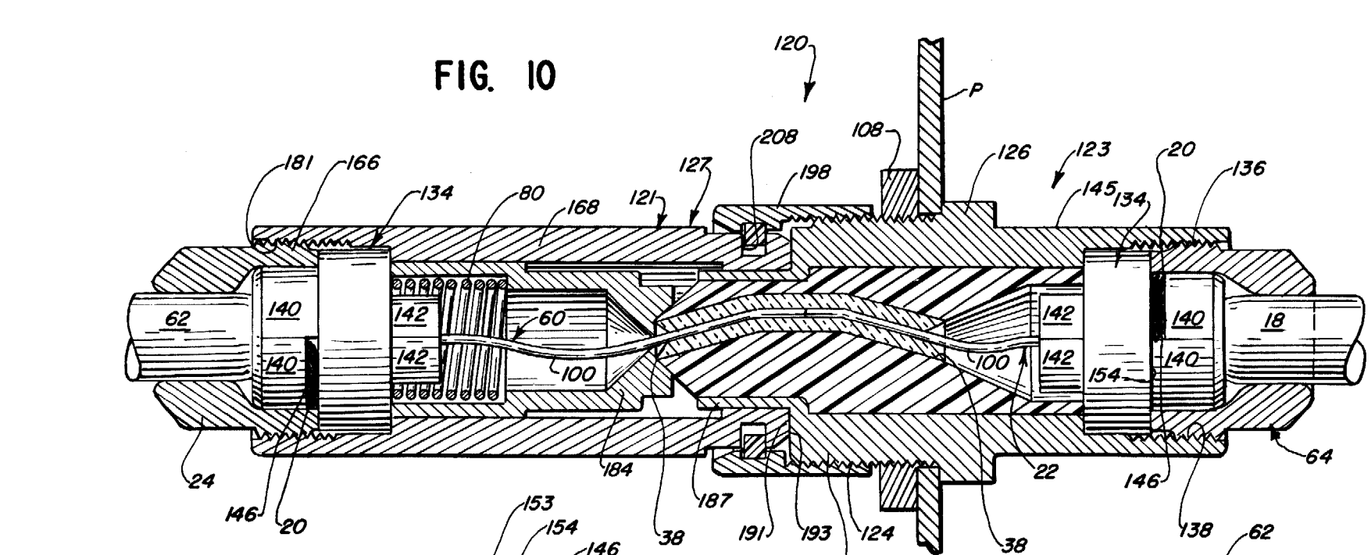
FIG. 10 is a longitudinal sectional view similar to FIG. 4 of the connector elements of FIGS. 7 through 9 mounted on a mounting panel.
Figure 11:
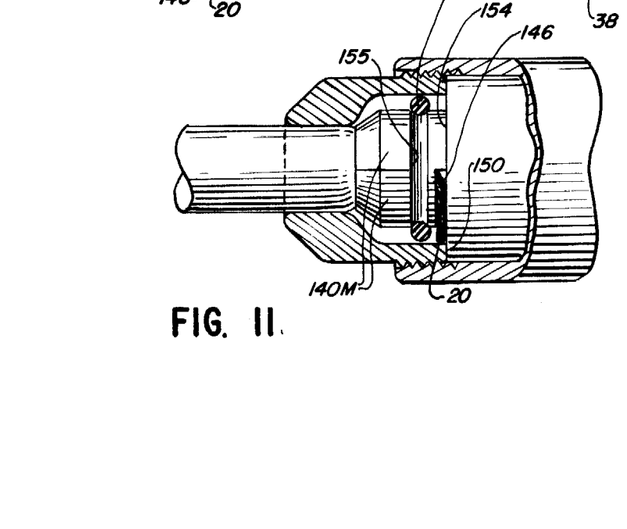
FIGS. 11 and 12 are views modified locking means for retaining the jaws of clamps employed in the provided connector in clamping engagement.
Figure 12:
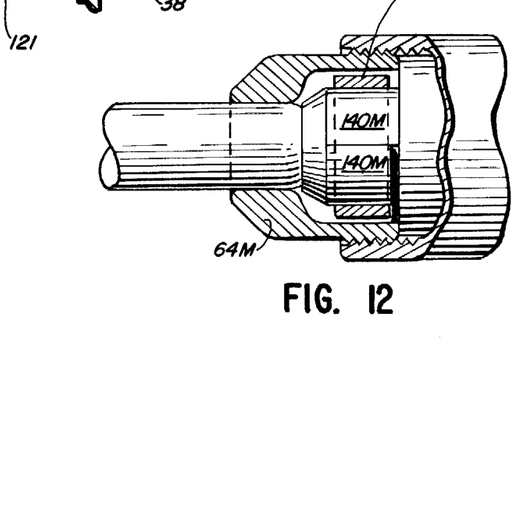

It will be noted from FIG. 10 that clamp jaws 140 possess slots 146 through which strength members 20 of the optical fiber cable 18 may pass. The fibers may be pinched in fixed engagement between annular edge 150 (FIG. 7) of clamp nut 24 and adjacent planar faces 154 of the hermaphroditic clamp halves 134H as illustrated in FIG. 10. FIG. 12 illustrates a clamp modification in which a band 62 is employed for retaining clamp jaws 140M in clamping engagement. The band 62 is also received in the cavity of clamp nut 64M as illustrated. Thus, no reliance need be made on the cavity wall of clamp nut 64M for jaw-closing purposes. In FIG. 11 an O-ring 153 is employed in a similar manner, the ring 153 being disposed in groove 155 of clamp jaws 140M.

Figure 9:
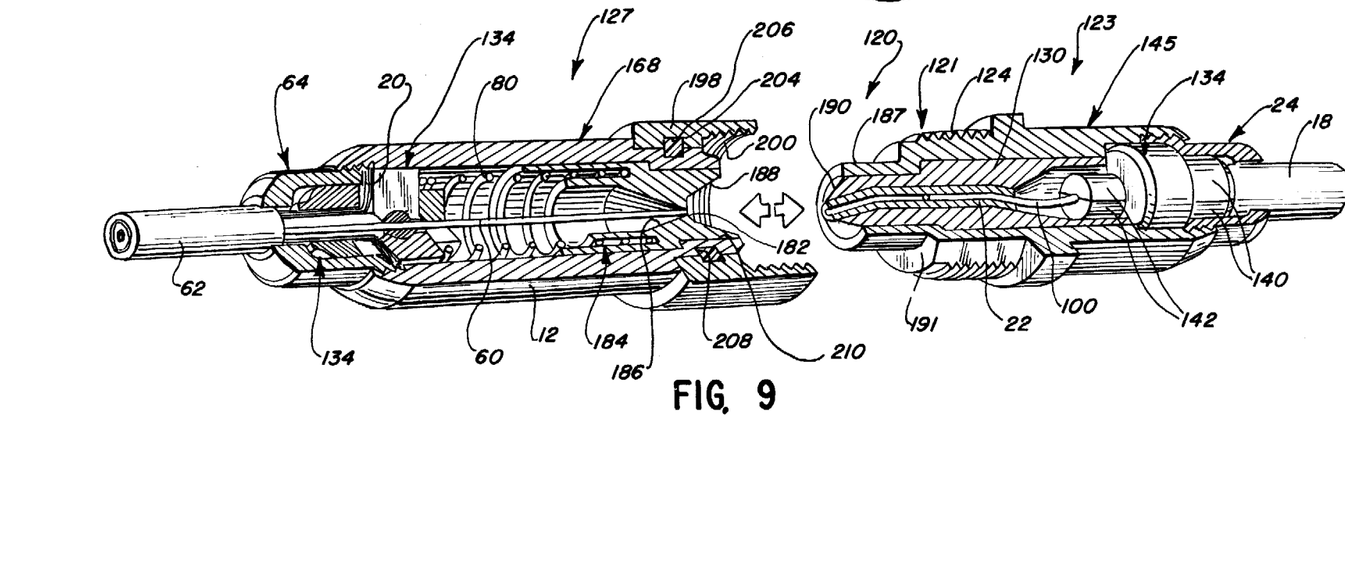
FIG. 9 is a perspective view of the connector components of FIG. 7 in assembled relationship prior to the plug and receptacle connector elements effecting an interlock by threaded engagement into the position of FIG. 8.

The optical fiber 22 of connector receptacle 123 is adapted to be connected in abutting relationship with the end of optical fiber 60 to be received from connector plug 127 illustrated in assembled relation in FIG. 9. The plug elements are illustrated in the exploded view in FIG. 7. The plug hermaphroditic clamp half portions 134H are the same as employed in receptacle 123, and jaws 140 are adapted to clampingly engage the periphery of optical fiber cable 62, whereas smaller clamping jaws 142 are adapted to clampingly engage the optical fiber 60 in a manner previously described. Cable 62 has been predeterminately trimmed prior to engagement with cable clamp 134. The length of the optical fiber 60 is adequate so as to be received in opening 182 of encompassing protective piston 184 which is reciprocally movable in sliding relationship relative to the internal periphery of the housing 168 of the plug 127.

Figure 8:
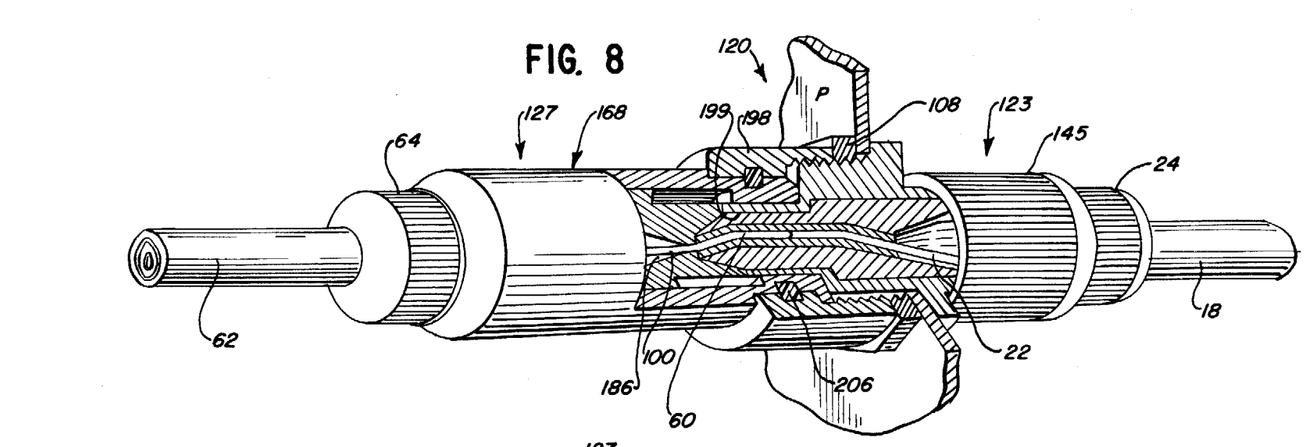
FIG. 8 is a perspective view of the connector elements of FIG. 7 in assembled interlocking relationship mounted on a mounting panel.

The aperture 182 in which the end of the optical fiber 60 is threaded has inner tapered entryway 186 to facilitate insertion of the optical fiber into the opening. Entranceway 186 also provides room in which fiber 60 may bend at 100 as seen in FIG. 8 in the course of entering fiber guide 32. The end of the piston 184 is configured, at 188 so as to mate with tapered end 190 (FIGS. 7, 9) of the matrix 130 in which the rod guide 32 of receptacle 123 is embedded. Coil spring 80 is employed for maintaining the clamp 134 and the protective sliding piston 184 in spaced relationship and compressing during feeding of fiber 60 into guide 32. It will be seen from FIG. 7 that annular shoulder 190 formed on the internal periphery of plug housing 168 functions as a positive stop when engaging annular shoulder 192 of the spring loaded piston 184. Shoulder 190 defines the maximum distance that piston 184 may extend from the cable clamp 134 within housing 168.

The elements of the connector plug of FIG. 7 are assembled in precisely the same order as the comparable elements of plug 14 above described. Externally threaded clamp nut 64 upon engaging threads 181 of housing 168 by means of threads 150 may serve to clamp the hermaphroditic half clamping jaws together while simultaneously effecting a locking "pinch" action with the strength members 20 as illustrated in FIG. 9.

Secured about the periphery at the end of plug housing 168 oppositely disposed to the clamp 134 is a freely rotatable, internally threaded locking ring 198 having female threads 200 formed therein. The ring is retained in assembled relationship with housing 168 by means of a spring retainer ring 204 engaging inner recess 206 of the freely rotating ring 198 and outer recess 208 formed about the outer periphery of receptacle housing 168 as illustrated in FIGS. 7 and 10.

For purposes of securing the plug 127 and receptacle 123 together, the threads 200 of ring 198 are engaged with the male threads 122 formed about the outer periphery of housing 121 (FIG. 7) of receptacle 123. As the threaded engagement proceeds, recess 188 of piston 184 mates with conical end 190 projecting from the end of the matrix 130 of receptacle 123 in the manner more clearly see in FIGS. 8 and 10. As the threaded engagement of the ring 198 of the plug and the housing of the receptacle continues, spring loaded piston 184 is forced to slidably retract within the encompassing housing 168 of the plug 127. Simultaneously with such retraction, optical fiber 60 proceeds into the entryway 38 of optical fiber guide 32, see FIG. 15.

It will be noted from FIG. 10 that the telescopic advancement of receptacle cylindrical end 187 (FIG. 7) of receptacle housing 121 into the open end of plug housing 168 will come to a precise halt when annular stop shoulder 191 of receptacle housing 121 abuts distal annulus 193 of the plug housing 168. Thus, the lengths of the optical fibers 60 and 22 which are to be joined may be cut to precise length with the resulting juncture disposed in substantially the center of passageway 36 of optical fiber guide 32 in the manner illustrated in FIGS. 7, 8 and 10.

As seen in FIG. 10 cylindrical end portion 187 of the connector receptacle 123 received in telescoping engagement with cylindrical surface 199 (FIG. 7) of the connector plug together with the threaded engagement between the lock collar 198 and the external periphery of the receptacle housing assures a rigid, double-telescoping plug-receptacle assembly. The assembly is extremely resistant to disengagement and comprises a connector of exceptional strength. For purposes of disengaging the plug and receptacle, all that need be done is threadably withdraw the lock collar 198 from the threads 124 of the receptacle housing 121 and withdraw the plug and receptacle from engagement.

Although it is preferred that the construction of FIGS. 7 through 12 be formed of metal, it may, of course, also be formed of a variety of plastics. The connector constructions of FIGS. 1 through 6 may be formed of a metal such as aluminum which allows the desired flexibility in the flexing locking arms.

Whereas the foregoing description has been specific to connectors adapted for joining the ends of a single optical fiber it is believed apparent that the foregoing constructions may be used to advantage for effecting junctures of a plurality of optical fibers in multi-fiber cables. Thus, in FIG. 17 it will be seen that clamp 16 having resilient inserts 25 in fiber clamping jaws 15 may simultaneously secure, by way of example, three optical fibers 60. The fibers are of such small diameter (e.g., 005") that a plurality may readily pass through opening 0 of pin 17 of FIG. 5 or the opening defined by clamp halves 16 of FIG. 6. The fibers 60 may pass through the end of a piston 201 (FIG. 18) which has three openings 203 with outer tapered fiber entryway 205 for reception of a mating tapered end of a receptacle matrix in which three fiber guides 32 are arranged as indicated by the sectional view of FIG. 10 illustrated on a greatly enlarged scale. The entryway may have a slot 213 for receiving a key formed on the receptacle matrix and guide the same into desired relation. Also, rods 33 defining the guides 32 may simultaneously be employed in more than one guide.

Figures 17, 18:
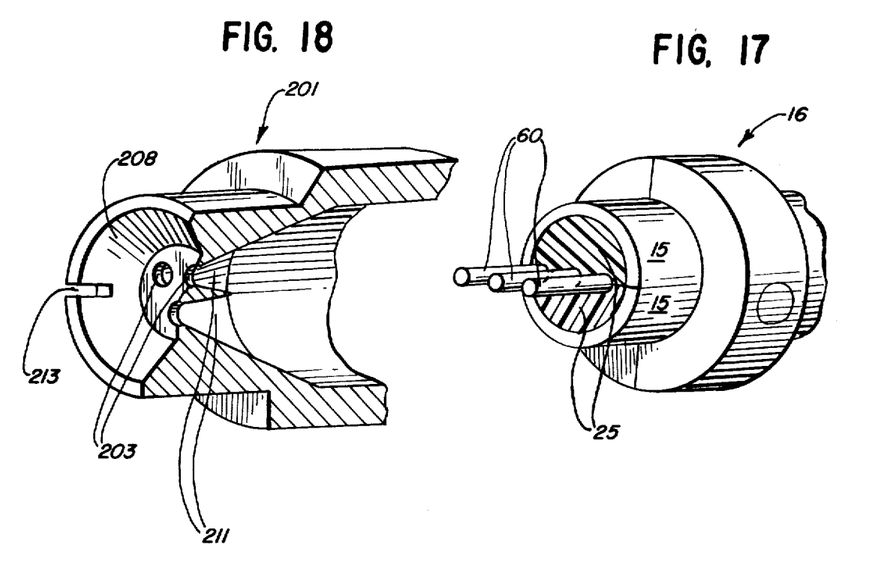
FIG. 17 is a perspective view of a connector clamp engaging a plurality of optical fibers.
FIG. 18 is a perspective view of a plug piston adapted to connect a plurality of fibers of a multi-fiber cable simultaneously.
Figure 19:
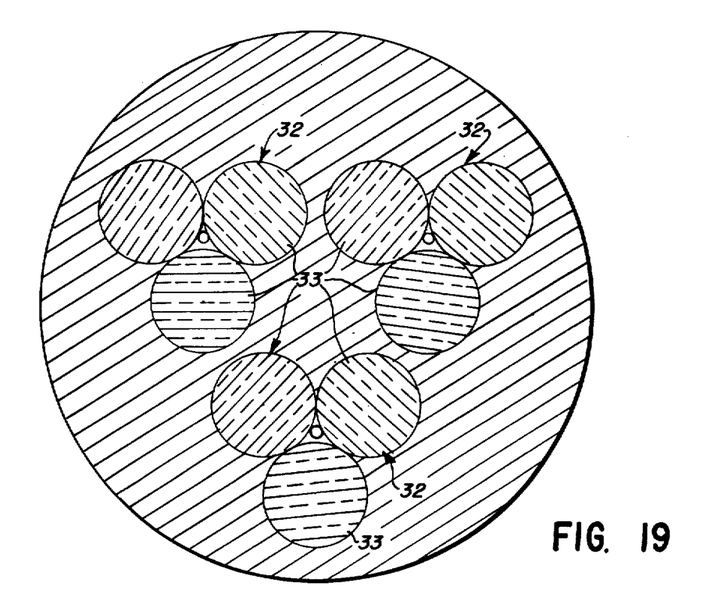
FIG. 19 is a transverse sectional view of a plurality of fiber guides disposed in a single receptacle made in accordance with this invention.

The piston 201 also has inner fiber entryways 211 for guiding the fibers 60 into piston openings 203 and providing an inner piston volume for the desired fiber bends 100 above discussed permitting an angled fiber entry and the desired tracking bias above discussed. The remaining connector construction may be as above described.

The provided connector constructions assure desired central location of the optical fiber to be inserted into an optical fiber guide. After assembly of the receptacle to the plug the optical fiber is completely protected. The plug assemblies may be transported over great distances without danger of damage to the fibers.

The provided connector constructions may be readily assembled and disassembled on mounting panels such as the illustrated panels P in the drawing with the assistance of locking collars 108. Also, the fiber guide constructions may have disposed in the fiber passageways a liquid having the same index of refraction as the light-conductive core of the optical fibers for purposes of minimizing any light loss. The above-discussed constructions provide for accurate alignment of the fiber ends by virtue of the bias imparted to the optical fibers in the course of entering the nonaxial passageways disposed in the optical fiber guides. As a result the fibers are located in a precise "track" of the fiber guide passageway. The fiber guide nonaxial entryways forcibly bend the entering optical fibers whereby the mating force is restricted to a controlled, compressive face-to-face engagement at the fiber ends which assures desired mating of the fiber ends without fiber damage.

It is believed that the foregoing description has been made apparent a number of modifications which can be made in the structures disclosed which will remain within the ambit of the invention embodied in the previously described connectors. Accordingly, it is intended that this invention be limited only by the scope of the appended claims.

What is claimed is:

1. A connector for connecting the ends of optical fibers comprising a connector receptacle; optical fiber guide means mounted therein having opposed entranceways and a fiber-receiving passageway of such size as to readily receive such fiber ends therein; said passageway having a track means whereby optical fiber ends disposed thereon may be axially aligned, spaced portions of said guide means being formed whereby optical fibers entering said opposed entranceways are biased onto said track means; a receptacle portion in encompassing relation with said fiber guide means; a terminal end of said guide means defining an end receptacle portion in spaced relation with an encompassing receptacle shell portion; a connector plug comprising a housing having optical fiber clamp means mounted therein; retractable, fiber-encompassing means reciprocally movable in said plug housing relative to said clamp means; said fiber encompassing means having a fiber locating means at one end and a relieved inner portion communicating with said locating means whereby a fiber portion entering said locating means from the interior of said fiber-encompassing means may readily bend; said receptacle fiber guide terminal end being telescopically received in a terminal end of said plug housing whereby said fiber encompassing means is engaged thereby and forced to retract toward said clamp means.

2. The connector of claim 1 in which said fiber encompassing means comprises a fiber-centering means having an apertured end adapted to centrally receive an optical fiber therethrough; said end being externally configured to intermate with an end of said receptacle optical fiber guide.

3. The connector of claim 2 in which said fiber encompassing means comprises a spring loaded piston in which a compression spring engages said clamp at one end and said piston at an opposite end.

4. The connector of claim 3 in which the aperture in said fiber-encompassing means apertured end and said optical fiber guide entranceways are disposed along the central longitudinal axes of said connector plug and receptacle.

5. The connector of claim 1 in which said encompassing receptacle portion comprises opposed resiliently movable locking arms having locking means formed therein and said plug housing terminal end inner periphery telescopically receives said arms and surrounds the entire length of said arms in the course of effecting a plug-receptacle connection; said inner periphery having locking means cooperating with said receptacle locking means at the end limit of plug-receptacle telescopic engagement.

6. The connector of claim 5 in which outwardly projecting vanes are formed on each of said locking arms and receiving slots are formed in said plug housing distal end for snugly receiving said vanes whereby relative rotary movement between said plug and connector is prevented in the course of effecting a plug-receptacle telescopic engagement.

7. The connector of claim 1 in which male threads are disposed about the housing and a locking collar having female threads is mounted on said plug housing outer periphery and is freely rotatable relative thereto; said threads being located so as to be engageable when the end of said receptacle guide means is engaged with said plug fiber locating means in the course of a plug-receptacle telescopic engagement.

8. The connector of claim 7 in which threaded engagement between said plug collar and said receptacle threads is limited by abutment of said plug housing engaging an outer housing annulus of said receptacle at the termination of the plug-receptacle telescopic engagement.

9. In a method for effecting a connection between first and second ends of optical fibers in a guide having an open ended passageway of such size as to readily receive said fibers, and having a track for coaxially aligning ends of fibers to be butted in a signal transmissive connection, the passageway being formed so as to bias fibers entering opposed, guide ends onto said track; the steps comprising locating a first fiber end on such track between the track ends; encompassing the end portion of a second optical fiber to be connected to said first optical fiber with a protective covering; locating the terminal end of such second optical fiber to be connected to said first optical fiber adjacent the guide open end opposed to said first fiber; simultaneously axially advancing such second optical fiber into said open ended guide and withdrawing said protective covering from that portion of the second optical fiber entering said fiber guide passageway until a butting engagement between said first and second optical fibers is effected on said passageway track.

10. The method of claim 9 in which said second fiber is fed into said passageway open end after the second fiber end has contacted said first fiber end whereby a fiber portion adjacent said passageway open end is flexed into a curved configuration due to the resistance afforded by the first fiber end.

11. A connector for connecting the ends of optical fibers comprising a first connector means; optical fiber guide means mounted therein; said guide means having an open-ended fiber receiving passageway; fiber-aligning track means disposed in said passageway; said passageway being of such configuration that optical fiber ends inserted into opposed open ends thereof and urged into abutting engagement are axially aligned on said track means; a second connector means for mating with said first connector means; said second means having a reciprocally movable optical fiber encompassing means mounted therein; said fiber encompassing means having an apertured fiber locating end adopted to be traversed by an optical fiber, and means for guiding said fiber locating end and one end of said guide means into adjacent relationship whereby an optical fiber passing through said fiber locating end may pass into an open end of said guide means; said fiber encompassing means having a relieved portion in which an optical fiber passing through the fiber locating end and passing into said guide means may bend upon encountering resistance to movement in said guide means.

12. The connector of claim 11 in which a threaded locking ring is rotatably disposed about the periphery of said second connector means housing and threadably engages threads disposed about the periphery of said first connector means and said fiber guide means is telescopically receivable in said second connector means housing.

13. An optical fiber receptacle for receiving an optical fiber end for purposes of effecting an optical signal transmissive connection comprising a housing; a clamp in said housing for clamping an optical fiber; an optical fiber guide having an optical fiber passageway spaced from said clamp with fiber entranceways defining opposed passageway end limits disposed in said housing adjacent said clamp whereby an end portion of an optical fiber disposed in said clamp may enter said guide passageway; the entranceways to said passageway for said optical fiber guide being angularly disposed to the receptacle longitudinal axis whereby optical fibers entering said entranceways are forced to assume a curved configuration adjacent said entranceways; the interval between said clamp and fiber guide entranceway being adequate to allow an optical fiber disposed in said clamp to gradually bend without impairment of the light conducting ability of said fiber.

14. The connector of claims 1, 13 or 11 in which said guide means comprises a plurality of cylindrical surfaces defining a cusp-shaped interstitial fiber-receiving channel; one of said cusps defining said track means.

15. The connector of claims 1, 13 or 11 in which optical fiber ends are disposed in said fiber-receiving passageway in optical signal transmissive engagement.

* * * * *